(12) United States Patent
Jansen Van Doorn

(10) Patent No.: US 7,050,721 B1
(45) Date of Patent: May 23, 2006

(54) SYSTEM HAVING AN IMPULSE NOISE FILTER MEANS

(75) Inventor: Arnold Karel Jansen Van Doorn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 667 days.

(21) Appl. No.: 09/706,667

(22) Filed: Nov. 6, 2000

(30) Foreign Application Priority Data

Nov. 4, 1999 (EP) ................................ 99203641

(51) Int. Cl.
*H04N 7/173* (2006.01)
(52) U.S. Cl. ...................................... 398/159; 725/124
(58) Field of Classification Search ................ 398/115, 398/159, 140, 182, 194, 76, 9, 158; 725/125, 725/124, 127; 370/249; 455/134; 333/17.1; 330/107; 375/256
See application file for complete search history.

(56) References Cited

U.S. PATENT DOCUMENTS

| 4,207,543 A | * | 6/1980 | Izakson et al. ............. 333/17.1 |
| 5,142,690 A | * | 8/1992 | McMullan et al. .......... 725/124 |
| 5,915,205 A | * | 6/1999 | Chen .......................... 725/125 |
| 6,151,559 A | * | 11/2000 | Williams ...................... 702/58 |

\* cited by examiner

*Primary Examiner*—David C. Payne

(57) ABSTRACT

A communication system comprises a network, such as a hybrid fibre coax (HFC) network, one or more optical transmitters and potential impulse noise sources for example electrical in-home equipment, as well as filter means coupled between the noise sources and the at least one optical transmitter, which filter means have a cut-off frequency, which is chosen in dependence on the noise frequency. Such an implementation prevents the optical filters in the upstream path of the system from blanking-out during periods of noise interference due to in particular in-home appliances. This improves a reliable upstream data transfer.

5 Claims, 2 Drawing Sheets

SYSTEM HAVING AN IMPULSE NOISE FILTER MEANS

BACKGROUND OF THE INVENTION

The present invention relates to a communication system, comprising a network, one or more optical transmitters and potential noise sources.

The present invention also relates to filter means for application in the communication system.

Such a communication system and filter means are known from U.S. Pat. No. 5,142,690. The known communication system is particularly concerned with upstream communication in a typical cable television (CATV) system, that is in return direction from subscriber to head end. Such a system is further known to have possible fibre optic means, such as optical transmitters, which may well known be included in its trunk lines, such as the trunk line 141 in FIG. 1 thereof. Said upstream communication is subjected to serious and accumulating, so called ingress noise emanating from a variety of types of noise sources such as impulse noise sources, in particular in-home or external noise sources, which have a impulse-like behavior, meaning that this noise varies with time and generally lasts up to several milliseconds. Examples of such impulse noise sources are switches, lighting, machines, such as washing machines, drying machines, refrigerators, magnetrons, communication devices, such as mobile telephones, facsimiles, printers, computers, displays, ignitions, radio stations etcetera. During periods of noise interference the upstream communication may, apart from being disturbed be completely blanked-out. After the blank-out period synchronization has to be re-established in order to recover from a period of lack of communication. This reduces the upstream data transfer rate of the known communication system and leads to undue communication delays.

SUMMARY OF THE INVENTION

Therefore it is an object of the present invention to provide a more reliable communication system, which is less susceptible to noise interference, in particular impulse noise interference.

Thereto the communication system according to the present invention is characterized in that the communication system comprises filter means coupled between the noise sources and the at least one optical transmitter, which filter means have a cut-off frequency, which is chosen in dependence on the noise frequency. Similarly the filter means according to the present invention are characterized in that the filter means have a cut-off frequency, which is chosen in dependence on the noise frequency. It is an advantage of the communication system according to the invention that the filter means thus devised are capable of preventing the communication system to blank-out, because at least a clipping of the optical transmitter or transmitters in the system during such periods of noise interference is obviated. In practice this increases a reliable operation and upstream data communication in the communication system according to the invention.

An embodiment of the communication system according to the invention is characterized in that the cut-off frequency of the filter means lies around 10 to 15 MHz. Although its frequency components are not well defined the upper boundary of in particular ingress noise lies around 10 to 15 MHz. Thus upstream communication above the cut-off frequency remains possible in an undisturbed way anyhow.

A further embodiment of the communication system according to the invention is characterized in that the filter means are arranged as a high pass and/or a low pass filter. A variety of implementations, either comprising only a high pass filter, or a low pass filter, or a combination of both filters are now feasible.

A still further embodiment of the communication system according to the invention is characterized in that the filter means are arranged as adaptive filter means, such that if the noise arises it is being blocked from passing upstream through the communication system. It is an advantage that further implementations are feasible, wherein the use of a permanently operating, fixed, filter is prevented, such that blocking of the noise in the low frequency band is only prevented if such noise is actually present.

Still further implementations are characterized in that the communication system comprises a threshold detector and a controllable switch having a control input coupled to the threshold detector, and further in that the communication system comprises a summing device for summing at least one filtered version of an impulse noise containing RF signal.

BRIEF DESCRIPTION OF THE DRAWINGS

At present the communication means and filter means according to the invention will be elucidated further together with their additional advantages while reference is being made to the appended drawing, wherein similar components are being referred to by means of the same reference numerals. In the drawing.

DESCRIPTION OF THE PREFERRED EMBODIMENTS

Figure 1:
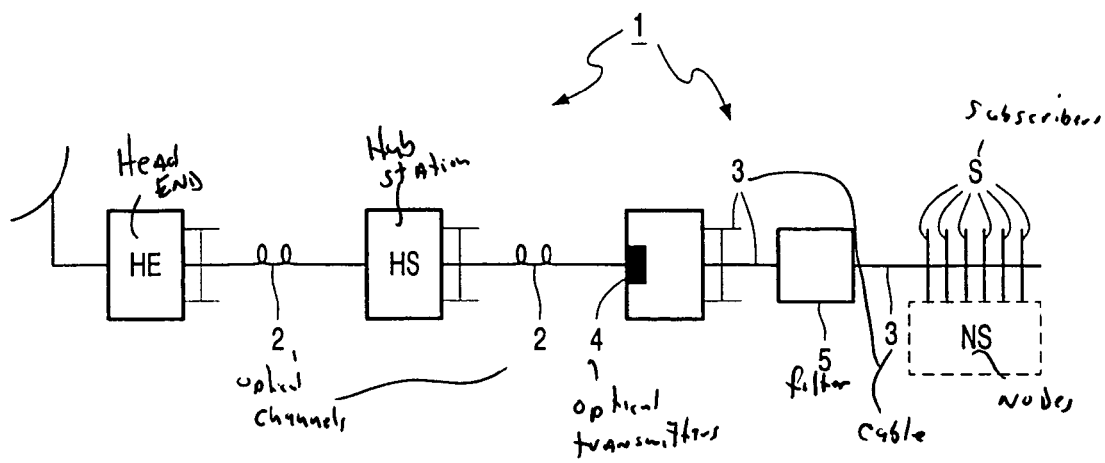
FIG. 1 shows a schematic diagram of a communication system according to the invention in the form of a hybrid fibre coax network.

FIG. 1 shows a diagram of a communication system 1 in the form of a network, such as a Central Antenna Television (CATV) Network. The system 1 as shown comprises a Head end (HE), which may for example communicate with a satellite (not shown), one or more so called Hub Stations (HS) and Nodes (N) for broadcasting data communication signals to subscribers S connected to the Nodes. The data communication signals may comprise several types of signals and data signals. Generally radio signals, television- and video signals, but also control signals, telephone signals and facsimile signals, and the like may be transmitted downstream to the subscribers S.

Upstream communication is also possible nowadays, whereby subscribers communicate through the system 1 to other subscribers. Upstream communication usually takes place in the range from 0 to for example 42 MHz or 65 MHz, whereas downstream communication can takes place in the higher range up to several GHz. The communication system 1 as exemplified is a hybrid fibre coax (HFC) network and comprises fibre optic channels 2 to the nodes N and coaxial cables 3 from the nodes to the subscribers S. Information is transmitted up and down over the fibre optic channels 2 through optical transmitters 4 and is usually bidirectionally transmitted through the coaxial cables 3. The subscribers S at home or in an office have various internal or external noise sources NS, in particular, but not exclusively impulse-like ingress noise sources providing a burst-like disturbance or interference. The upstream data transmission upstream may be severely blanked-out by such bursts.

Figure 2:
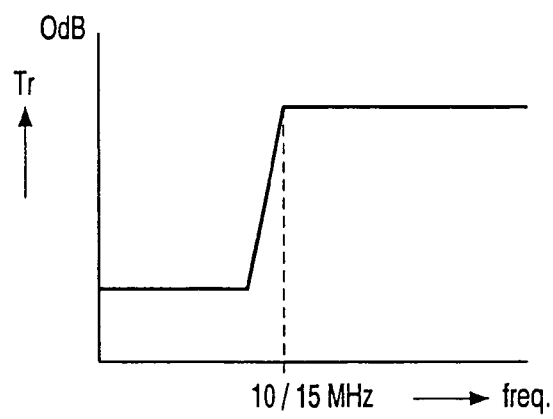
FIG. 2 shows a possible course of a high pass filter characteristic.

The communication system 1 is provided with filter means 5. Filter means 5 in the form of a fixed high pass filter 5H is provided in the coaxial part of the system, preferably directly before the optical transmitters 4. The cut-off frequency of the high pass filter 5H, whose filter characteristic is shown in FIG. 2 is chosen in dependence on the maximum expected noise frequency. Generally the maximum noise frequency is around 10 to 15 MHz. Cutting off this low frequency part in the upstream path appeared to reduce clipping of the optical transmitters 4, which caused the upstream data transmission to blank-out. The filter as shown has no attenuation above the cut-off or transition frequency and an attenuation between approximately 10–30 dB for lower frequencies.

Figure 3:
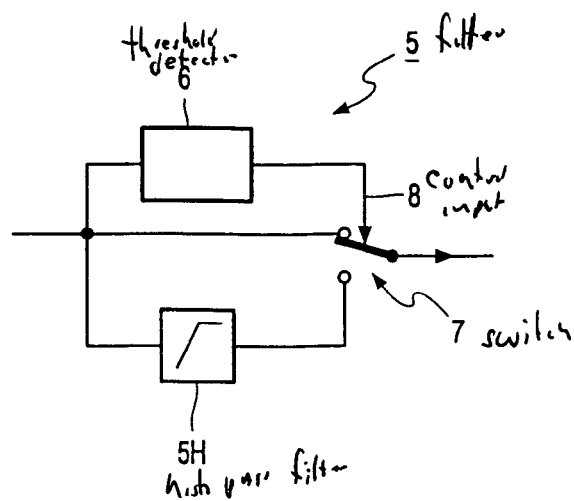
FIGS. 3–5 show possible implementations of adaptive filter means for application in the communication network of FIG. 1.
Figure 4:
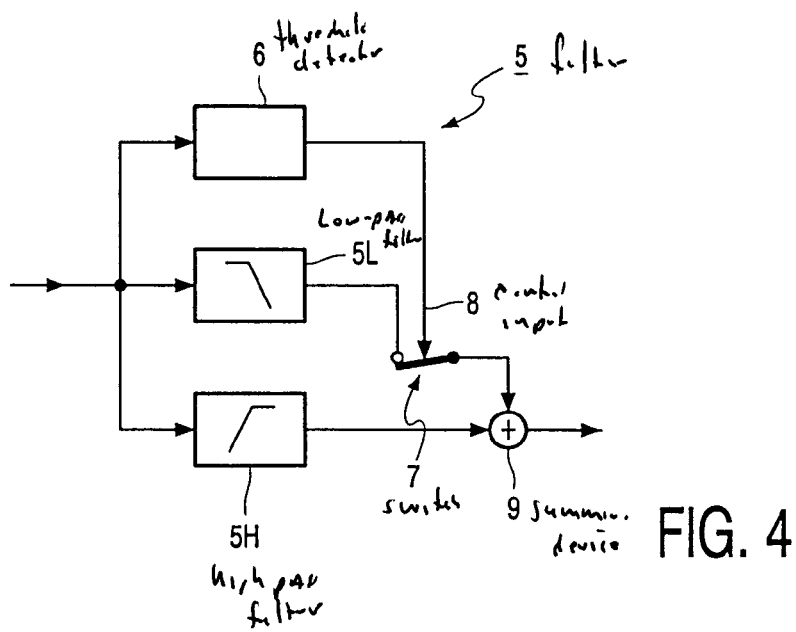
Figure 5:
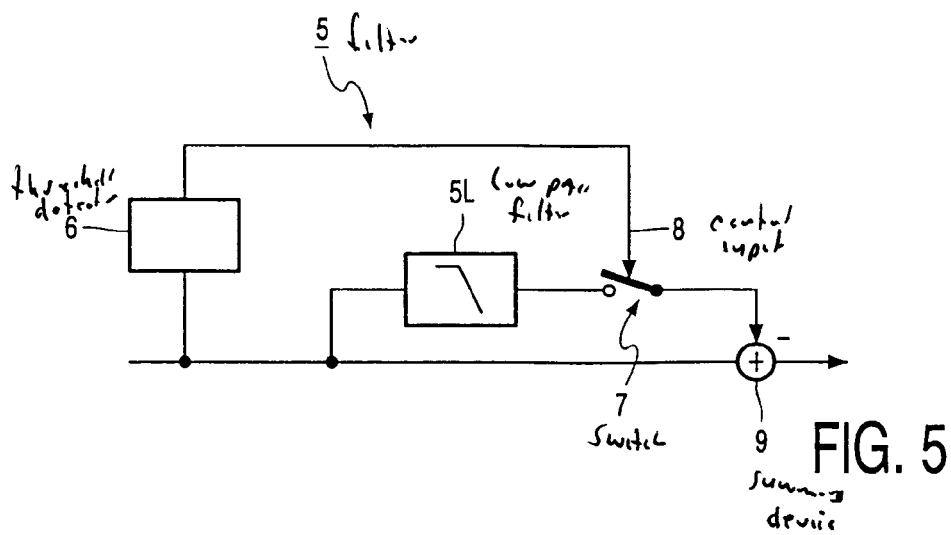

FIGS. 3–5 show several embodiments of the filter means 5 which are capable of adapting to appearing impulse noise. The filter means are adaptive by means of a threshold detector 6, which may be a simple amplitude or top detector in order to detect impulse noise in the low frequency range generally under 10 to 15 MHz, and a controllable switch 7 having a control input 8 coupled to the threshold detector 6. The embodiment of FIG. 3 comprises a controllable two-way switch 7. During absence of impulse noise the switch 7 takes the position as shown and the complete downstream signal is then passed from subscriber S to head end HE. Upon detection of impulse noise the switch 7 switches over and then a high pass filter 5H as described above comes in operation and filters out the low frequency band below 10 to 15 MHz to avoid clipping of the optical transmitter 4.

The embodiment of FIG. 4 shows essentially filter means in parallel arrangement of a high pass filter 5H as described above and a low pass filter 5L having a cut-off frequency, which is chosen in dependence on the impulse noise frequency. The filters 5H and 5L may have complementary filter characteristics. A summing device 9 connects both filter outputs, such that if no impulse noise is detected the complete signal will pass, whereas upon detection of noise only the high pass filter 5H is in operation.

FIG. 5 shows a further embodiment, wherein the complete signal is passed in a fail-safe way. In case of noise detection the one way switch 7 is closed and the one filter, which is a low pass filter 5L comes in operation. Here the summing device 9 subtracts the filtered signal from the input RF signal to reveal a high passed output signal, as required.

In two further implementations of the embodiments of FIGS. 4 and 5 input 10 of the threshold detector 6 is instead coupled to output 11 of the respective filter 5L. Of course the threshold of detector 6 has to be chosen appropriately. These implementations reveal an increased selectivity because the threshold detector 6 now only 'looks' at the low frequency range, where ingress noise is expected.

The invention claimed is:

1. A communication system, comprising:
   a network, one or more optical transmitters and that may be subjected to potential noise sources, wherein the communication system includes an adaptive filter coupled between the potential noise sources and the at least one optical transmitter, which filter has a cut-off frequency, dependent on the noise frequency, and a noise detector, wherein the adaptive filter (1) blocks detected impulse noise from passing upstream through the communication system, (2) enables prevention of clipping of the optical transmitter and (3) enables substantially undisturbed upstream communication above the cut-off frequency of the filter.

2. The communication system according to claim 1, wherein the filter is arranged as a high pass filter and/or a low pass filter.

3. The communication system according to claim 1, further comprising:
   a threshold detector and a controllable switch having a control input coupled to the threshold detector.

4. The communication system according to claim 3, further comprising:
   a summing device for summing at least one filtered version of an impulse noise containing RF signal.

5. The communication system according to claim 1, wherein the filter has a cut-off frequency in the range of 10 to 15 MHz.

* * * * *